US012762719B2

(12) United States Patent
Zhou et al.

(10) Patent No.: US 12,762,719 B2
(45) Date of Patent: Oct. 13, 2026

(54) OPTICAL FLOW-BASED FRAME INTERPOLATION TO SYNCHRONIZE BETWEEN SENSORS

(71) Applicant: NVIDIA Corporation, Santa Clara, CA (US)

(72) Inventors: Rongrong Zhou, Shenzhen (CN); Bin Li, Shanghai (CN); Qian Zhan, Shanghai (CN); Sameer Gumaste, Pune (IN); Sarvesh Satavalekar, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 244 days.

(21) Appl. No.: 18/783,218

(22) Filed: Jul. 24, 2024

(65) Prior Publication Data

US 2026/0024217 A1 Jan. 22, 2026

(30) Foreign Application Priority Data

Jul. 22, 2024 (CN) ......................... 202410986191.7

(51) Int. Cl.
*G06T 7/246* (2017.01)
*G01S 13/931* (2020.01)
(Continued)

(52) U.S. Cl.
CPC ............ *G06T 7/248* (2017.01); *G01S 13/931* (2013.01); *H04N 7/0127* (2013.01); *H04N 7/0137* (2013.01); *H04N 17/002* (2013.01); *G01S 2013/9315* (2020.01); *G01S 2013/9321* (2013.01); *G01S 2013/9323* (2020.01); *G01S 2013/9324* (2020.01); *G06T 2207/10028* (2013.01); *G06T 2207/10044* (2013.01); *G06T 2207/30252* (2013.01)

(58) Field of Classification Search
CPC ................ H04N 7/0137; H04N 7/0127; G06T 2207/30252; G06T 2207/10044; G06T 2207/10028; G06T 7/248; G01S 2013/9324; G01S 2013/9323; G01S 2013/9321; G01S 2013/9315; G01S 13/931
See application file for complete search history.

(56) References Cited

U.S. PATENT DOCUMENTS 5,477,542 A * 12/1995 Takahara ........... H04N 21/4341 375/E7.277
6,292,834 B1 * 9/2001 Ravi ..................... H04L 65/612 709/216

(Continued)

*Primary Examiner* — Michael B. Pierorazio
(74) *Attorney, Agent, or Firm* — Foley & Lardner LLP

(57) ABSTRACT

In various examples, systems and methods are disclosed that perform motion detection across image frames, such as optical flow determination, to synchronize an asynchronous frame with respect to a target time for the asynchronous frame. For example, image frames from a sensor can be processed by an optical flow accelerator to detect displacement across the image frames, and the displacement can be used to interpolate a modified frame at the target time. This can be used to perform data collection and combining operations such as stitching and/or reconstruction. The synchronization can be performed from sensor data from sensors such as cameras, LIDAR sensors, and/or RADAR sensors.

20 Claims, 11 Drawing Sheets

(51) Int. Cl.
*H04N 7/01* (2006.01)
*H04N 17/00* (2006.01)

(56) References Cited

U.S. PATENT DOCUMENTS 6,728,965 B1 * 4/2004 Mao ..................... H04N 21/426
725/38
7,224,837 B2 * 5/2007 Olshansky ......... H04N 21/2665
725/71
7,237,251 B1 * 6/2007 Oz ..................... H04N 21/4384
725/100
7,571,246 B2 * 8/2009 Virdi .................. H04N 21/2402
725/117
8,023,511 B2 * 9/2011 Komiya ................ H04L 65/611
370/312
8,249,141 B1 * 8/2012 Harris .................. H04N 19/102
375/240
8,380,790 B2 * 2/2013 Lee .................. H04N 21/25833
709/224
8,925,021 B2 * 12/2014 Ma ................. H04N 21/234309
725/89
8,990,351 B2 * 3/2015 Isaksson ............ H04N 21/4424
709/224
9,106,787 B1 * 8/2015 Holmer .................... H04N 7/12
9,226,022 B2 * 12/2015 Ferguson ......... H04N 21/44016
10,762,639 B1 * 9/2020 Hay ...................... G06T 3/4053
11,871,011 B2 1/2024 Satavalekar et al.
2006/0080724 A1 * 4/2006 Vermeiren ......... H04N 21/4384
348/E7.071
2010/0017443 A1 * 1/2010 Xie ..................... H04L 67/1095
707/E17.007
2010/0037267 A1 * 2/2010 Bennett .................. H04N 7/165
725/116
2013/0014156 A1 * 1/2013 Seo .................. H04N 21/44016
725/32
2015/0208079 A1 7/2015 Pore et al.
2018/0139496 A1 * 5/2018 Gustafsson ........ H04N 21/2393
2019/0335209 A1 * 10/2019 Birrer ................ H04N 21/8455
2023/0196662 A1 * 6/2023 Kaskela ............... G06N 3/0464
345/611
2023/0360254 A1 * 11/2023 Liu ........................... G06T 7/70
2024/0303836 A1 9/2024 Shin et al.
2024/0320993 A1 9/2024 Prakash et al.

* cited by examiner

OPTICAL FLOW-BASED FRAME INTERPOLATION TO SYNCHRONIZE BETWEEN SENSORS

CROSS-REFERENCE TO RELATED APPLICATIONS

The present application claims the benefit of and priority to Chinese Patent Application No. 202410986191.7, filed Jul. 22, 2024, the disclosure of which is incorporated herein by reference in its entirety.

BACKGROUND

Camera frame synchronization in sensor systems, such as for autonomous or semi-autonomous vehicle or machine systems, can be useful to ensure the accuracy and reliability of the perception, prediction, and decision-making processes. It can enable the system to have a coherent representation of the vehicle's environment, which can be useful for safe and efficient navigation. However, factors such as variations in exposure time and read out time, as well as frame rate differences amongst various sensors, can make it challenging to effectively perform synchronization.

SUMMARY

Implementations of the present disclosure relate to optical flow-based frame interpolation to synchronize between cameras. For example, systems and methods are disclosed that facilitate synchronizing between data streams from cameras based on motion-based image processing, such as optical flow-based frame interpolation. This can include generating an interpolated frame from data of a first camera to synchronize with a timestamp of a second camera, as well as generating interpolated frames to increase a frame rate from a given camera. For example, optical flow-based techniques can adjust and/or smooth motion between frames, which can reduce blur and/or incoherence. In some implementations, the frame interpolation can be performed using an optical flow accelerator (OFA), which can allow for greater hardware occupancy and/or more effective hardware utilization. This can be useful for applications including, for example and without limitation, data collection, surround view camera stitching, three-dimensional (3D) reconstruction, compensation for delays (e.g., transmission delays), increasing frame rates, perimeter blind spot enhancement, and perception fusion.

At least one aspect relates to one or more processors that include one or more circuits. The one or more circuits can detect an asynchronous condition of sensor data from a sensor. The one or more circuits can determine, responsive to detecting the asynchronous condition, motion associated with a first frame (e.g., input frame) of the sensor data and a second frame of the sensor data. The one or more circuits can generate a third frame based at least on the motion and the first frame.

In some implementations, the one or more circuits detect the motion by detecting an optical flow between the first frame and the second frame. The sensor can be a first sensor, and the one or more circuits can detect the asynchronous condition responsive to detecting a difference in time between a timestamp of the first frame and a timestamp of a fourth frame from at least one second sensor.

In some implementations, the one or more circuits are to detect the asynchronous condition responsive to detecting a missing frame not being received from the sensor at an expected timestamp for the missing frame. The one or more circuits can generate the third frame to have a timestamp equal to a timestamp of a fourth frame from a second sensor.

In some implementations, the one or more circuits generate the third frame to have a timestamp subsequent to a timestamp of the first frame and the second frame. The one or more circuits can detect the motion based at least on a displacement of a pixel representing an object from a first location in the first frame to a second location in the second frame. The sensor can include a camera, a light detection and ranging (LIDAR) system, or a radio frequency detection and ranging (RADAR) system.

At least one aspect relates to a system. The system can include one or more processing units one or more memory units storing instructions that, when executed by the one or more processing units, cause the one or more processing units to execute operations. The operations can include detecting an asynchronous condition of sensor data from a sensor, determining, responsive to detecting the asynchronous condition, motion associated with a first frame of the sensor data and a second frame of the sensor data, and generating a third frame based at least on the motion and the first frame.

In some implementations, the one or more processing units are to detect (e.g., are used to detect; are configured to detect) the motion by detecting an optical flow between the first frame and the second frame. The sensor can be a first sensor, and the one or more processing units can detect the asynchronous condition responsive to detecting a difference in time between a timestamp of the first frame and a timestamp of a fourth frame from at least one second sensor.

In some implementations, the one or more processing units are to detect the asynchronous condition responsive to detecting a missing frame not being received from the sensor at an expected timestamp for the missing frame. The sensor can be a first sensor, and the one or more processing units can generate the third frame to have a timestamp equal to a timestamp of a fourth frame from a second sensor.

In some implementations, the one or more processing units generate the third frame to have a timestamp subsequent to a timestamp of the first frame and the second frame. The one or more processing units can detect the motion based at least on a displacement of a pixel representing an object from a first location in the first frame to a second location in the second frame. The sensor can include a camera, a light detection and ranging (LIDAR) system, or a radio frequency detection and ranging (RADAR) system.

At least one aspect relates to a method. The method can include detecting, using one or more processors, an asynchronous condition of sensor data from a sensor. The method can include determining, using the one or more processors, responsive to detecting the asynchronous condition, motion associated with a first frame of the sensor data and a second frame of the sensor data. The method can include generating, using the one or more processors, a third frame based at least on the motion and the first frame.

In some implementations, the sensor is a first sensor, and detecting the asynchronous condition includes detecting at least a threshold time difference between the first frame and a fourth frame from a second sensor. The method can include generating the third frame comprises interpolating the first frame to a timestamp of the fourth frame.

In some implementations, generating the third frame includes interpolating the first frame to a timestamp of a missing frame. The missing frame can be a frame not received from the sensor within a threshold of an expected time for receiving the missing frame.

The processors, systems, and/or methods described herein can be implemented by or included in at least one of a control system for an autonomous or semi-autonomous machine; a perception system for an autonomous or semi-autonomous machine; a system incorporating one or more virtual machines (VMs); a system implemented using a robot; a system for performing deep learning operations; a system for performing simulation operations; a system for performing collaborative content creation for 3D assets; a system for generating synthetic data;

a system for performing digital twin operations; a system implemented using an edge device; a system comprising one or more vision language models (VLMs); a system comprising one or more large language models (LLMs); a system comprising one or more multi-modal language models; a system for performing conversational AI operations; a system for performing light transport simulation; a system implemented at least partially in a data center; or a system implemented at least partially using cloud computing resources.

BRIEF DESCRIPTION OF THE DRAWINGS

The present systems and methods for optical flow-based frame interpolation to synchronize between cameras are described in detail below with reference to the attached drawing figures, wherein.

DETAILED DESCRIPTION

Figure 1:
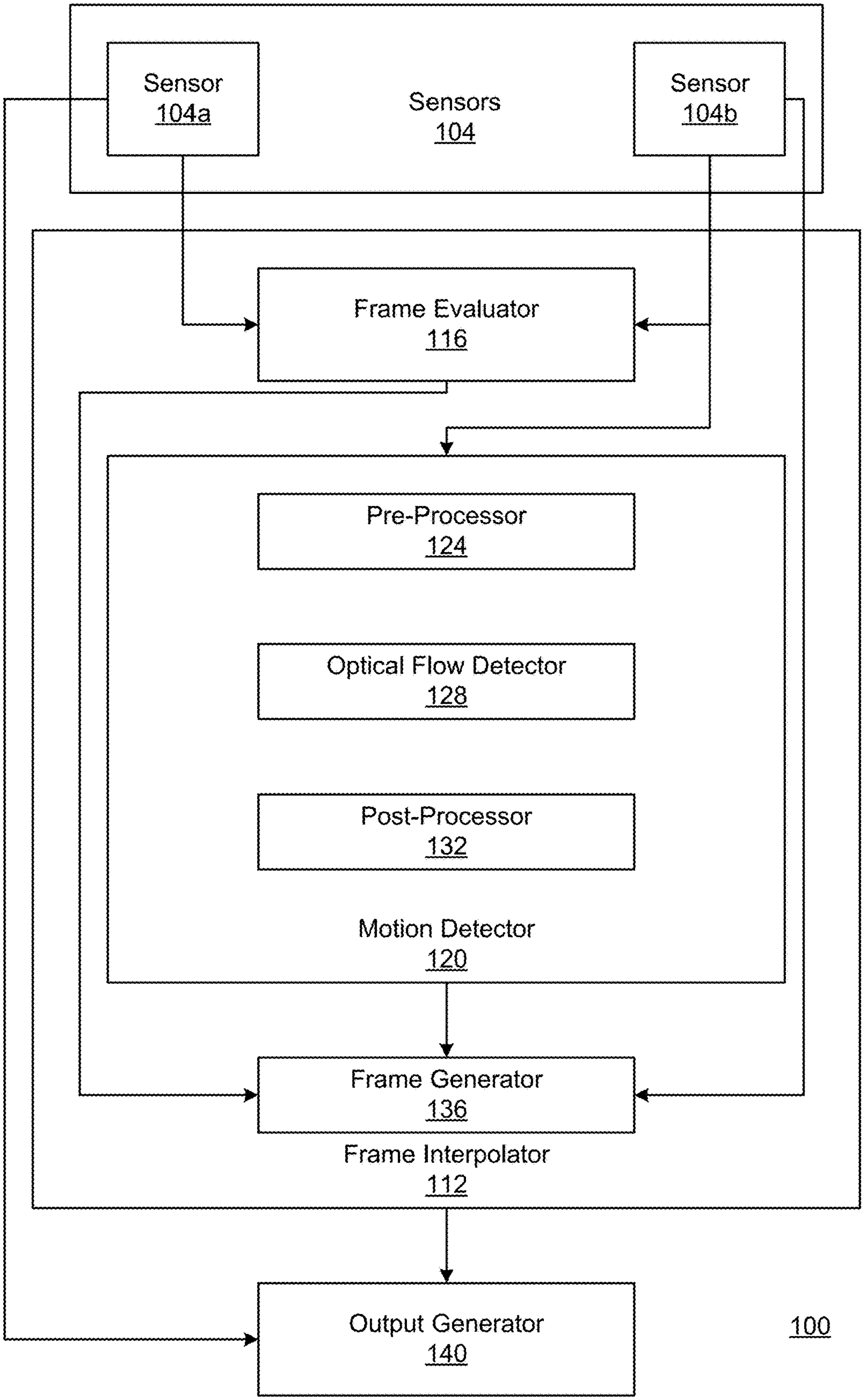
FIG. 1 is a block diagram of an example of a synchronization system, in accordance with some implementations of the present disclosure.

Systems and methods are disclosed related to optical flow-based frame interpolation to synchronize between cameras. Although the present disclosure may be described with respect to an example autonomous vehicle 500 (alternatively referred to herein as "vehicle 500," "ego-vehicle 500," "machine 500," or "ego-machine 500," an example of which is described with respect to FIGS. 5A-5D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to synchronization between data streams of sensors of autonomous or semi-autonomous machines, this is not intended to be limiting, and the systems and methods described herein may be used in augmented reality, virtual reality, mixed reality, robotics, security and surveillance, autonomous or semi-autonomous machine applications, and/or any other technology spaces where sensor data synchronization and/or fusion may be used.

Synchronization can include at least two techniques: hardware synchronization and software synchronization. Hardware synchronization can include utilizing hardware capabilities to guarantee simultaneous data sampling across multiple sensors. Software synchronization can include time synchronization. Time synchronization, e.g., time alignment, can be achieved by providing a unified reference time to all sensors, ensuring the consistency of data collection timing. In some implementations, synchronization can include spatial synchronization, such as to include processes to ensure that data collected from different sensors can accurately correspond to the same location or object in the environment.

Hardware synchronization can rely on one or more of a unified time reference, a trigger mechanism, and calibration and/or testing. The unified time reference can be used to ensure precise coordination among sensors, including, for example and without limitation, imaging sensors such as cameras, LiDAR, and radar. For example, a high-precision clock source can be used as a unified time reference. The trigger mechanism can be external (e.g., to one or more sensors) to simultaneously start the capture process on all cameras. This can be achieved by through hardware trigger lines, where a central control unit sends a FSYNC signal to all cameras, providing simultaneous image capture. Before deploying the system, the synchronization mechanism can have rigorous calibration and testing to minimize timing discrepancies, achieving accuracy with errors on the order of microseconds.

Software synchronization can rely on one or more of timestamp management and development of algorithms that utilize synchronized date effectively. These algorithms can perform tasks such as sensor fusion, object detection, and decision-making, taking advantage of the temporal and spatial alignment of data from multiple sensors.

Various such techniques can be limited in the precision and/or reliability of the synchronization that can be achieved. Timestamp management and/or synchronization can include synchronizing clock sources, given that the internal clocks of each sensor may drift in an inconsistent manner. Hardware synchronization can be used to ensure that the trigger times are the same, e.g., ensuring that each sensor is triggered at the same rising edge (given that synchronizing the clock sources may only ensure consistent intervals). Software synchronization can involve maintaining a time gap to be compatible with differences in readout times amongst sensors that cannot be synchronized.

However, since the exposure time length of each sensor varies, there can still be deviations for each sensor. The inconsistency in exposure time length can be influenced by many factors, such as different batches, brands, and resolutions, which can all affect the exposure time, making it difficult to achieve complete timestamp synchronization.

For example, sensors, including cameras, can have at least two trigger modes: trigger exposure time and trigger read out. Even if sensors are triggered at the same time (e.g., by a hardware FSYNC signal trigger), differences in exposure times can result in different end exposure times, leading to asynchronous condition, such as where one sensor has greater exposure time and thus captures more information than other sensor(s).

Some systems can use read out time control to facilitate synchronization, such as by maintaining a synchronized time for reading out data from sensors. However, read out time cannot always account for different imaging times (e.g., resulting from different lengths of exposure), and may not be useful where the sensor performs other operations after exposure and before read out, such as color conversion.

Failure to properly synchronize frames in camera data can lead to significant issues in sensor data processing, including, for example, stitching of a surround view. For example, in a surrounding environment of a plurality of sensors, dynamic objects (such as other vehicles and pedestrians) can move quickly. If the cameras are not synchronized, the captured images can have discrepancies in the positions of dynamic objects due to timing differences. This can include misalignment of objects, variations in brightness and contrast (e.g., exposure differences), and/or visible seams. In addition, in multi-sensor fusion perception systems, various sensors such as LIDAR, cameras and millimeter-wave radar are combined to create a comprehensive understanding of the environment. Their frame rates can differ; for example, LIDAR can have a frame rate of 10 frames per second (fps), and cameras can have frame rates such as 25 fps/28 fps/30 fps/60 fps. When the frame rates of multiple sensors cannot be evenly divided, their data may only be synchronized within a certain range.

Systems and methods in accordance with the present disclosure can address such considerations to allow for more effective synchronization amongst sensors, even where the sensors can have differing frame rates, exposure times, exposure lengths, and/or post-processing operations. For example, a system can perform optical flow techniques on frames from an asynchronous sensor to detect motion between the frames, and can generate a new frame at a selected timestamp based on the detected motion to provide synchronization between the sensors, e.g., between the frames from the sensors. This can allow for higher quality outputs of processes that rely on data, such as image and/or image-like frames from multiple sensors, from multiple sensors. For example, image data from one or more cameras, LIDAR sensors, and/or radar sensors can be combined, such as to be stitched to form a surround view (e.g., in a surround view system (SVS) of a vehicle, with reduced blur, disjointed features, seams, and/or exposure variations, for example and without limitation. Such operations can be useful applications including but not limited to data collection, autonomous driving, and smart cabin integrations. In some implementations, at least some of the operations described herein, including optical flow operations, can be performed using hardware that has relatively low utilization by vehicle components, such as programmable vision accelerator (PVA) and/or optical flow accelerator (OFA) hardware, allowing for greater overall utilization without increasing burdens on CPU and/or GPU resources. In addition, PVA and OFA hardware can have greater power and/or energy efficiency relative to CPU and/or GPU components, which can be useful in applications including but not limited to vehicle and portable electronic device applications. Systems and methods in accordance with the present disclosure can be used for end-to-end (E2E) implementations, such as to synchronize frames before they are used by downstream operations such as functions for 2D stitching or 3D reconstruction. Systems and methods in accordance with the present disclosure can be implemented for virtual reality (VR) and augmented reality (AR) applications, motion analysis, video special effects production, and/or applications that rely precise time alignment of multiple video sources.

With reference to FIG. 1, FIG. 1 is an example system 100 to perform optical flow-based frame interpolation, in accordance with some implementations of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some implementations, the systems, methods, and processes described herein may be executed using similar components, features, and/or functionality to those of example autonomous vehicle 500 of FIGS. 5A-5D, example computing device 600 of FIG. 6, and/or example data center 700 of FIG. 7.

The system 100 can include or be coupled with a plurality of sensors 104, such as a first sensor **104*a* and a second sensor 104*b*. The sensors 104 can include one or more imaging sensors. The sensors 104 can include any one or more cameras, video cameras, LIDAR sensors, RADAR sensors, and/or ultrasound sensors, for example and without limitation. The system 100 can receive and/or process data from the sensors 104 as data streams. The system 100** can output streams of synchronized frames for operations including but not limited to 2D stitching and 3D reconstruction.

The sensors 104 can detect sensor data, such as image data, that represents an environment around the sensors 104 and/or one or more objects in the environment. For example, the sensors 104 can output the sensor data, such as frames (e.g., image frames) of sensor data, in a two-dimensional and/or three-dimensional data structure of pixels that represent features of the environment and/or the one or more objects.

The sensors 104 can output the sensor data at a rate, such as a frame rate. The sensors 104 can detect the sensor data according to an exposure time of at least one of a start time of data capture or an end time of data capture. The sensors 104 can have read out times at which the frames of the sensor data are sampled and/or retrieved, and can perform processing of sensor data prior to read out. The frames can have timestamps that indicate a time of detection of the sensor data.

As explained above, various such timing considerations can result in asynchronous condition between sensor data outputted by respective sensors 104. For example, the first sensor 104*a* can output frames (of sensor data) at a first frame rate, and the second sensor 104*b* can output frames at a second frame rate different than the first frame rate. The sensors 104 can undergo conditions in which a frame is not outputted in a given instance, such as where a frame is dropped.

The system 100 can include at least one frame interpolator 112. The frame interpolator 112 can process frames from the sensors 104 to determine whether to interpolate frames that can be used to address asynchronous condition. The frame interpolator 112 can generate interpolated frames (e.g., modifications of frames from the sensors 104) responsive to detecting conditions such as asynchronous condition among the sensors 104 and/or data from the sensors 104. The frame interpolator 112 can be used to synchronize data in stages; for example, data from cameras can be synchronized prior to synchronization with other sensors such as LIDAR and/or RADAR sensors. The frame interpolator 112 can be used to interpolate frames forward (e.g., modifying a given frame of a first timestamp to a target timestamp subsequent to the first timestamp) or backwards (e.g., modifying the given frame to a target timestamp prior to the first timestamp). The frame interpolator 112 can generate frames to increase a frame rate from one or more sensors 104, e.g., to modify a first frame forwards or a second frame backwards to a timestamp between the first frame and the second frame based on motion detected between the first frame and the second frame.

The frame interpolator 112 can include a frame evaluator 116. The frame evaluator 116 can evaluate frames from the sensors 104 to detect at least one condition associated with asynchronous condition, including, for example, detecting a time difference (e.g., offset) between frames and/or detecting missing frames. For example, the frame evaluator 116 can identify a first timestamp of a first frame from the sensor 104*a*, and can identify a second timestamp of a second frame from the second sensor 104*b*. The frame evaluator 116 can compare the first timestamp with the second timestamp to detect the time difference between the first frame and the second frame. The frame evaluator 116 can detect the condition based at least on the time difference, such as to detect the condition responsive to the time difference being greater than a threshold difference. The threshold difference can be on the order of milliseconds or less. The threshold difference can be less than the frame rate, such as to be a fraction of the frame rate. In some implementations, the threshold difference is zero, e.g., the system 100 operates to eliminate offsets between frames. With respect to missing frames, the frame evaluator 116 can determine that a frame is not received (e.g., from second sensor 104*b*) in an expected period (e.g., in accordance with a frame rate of the sensor 104*b*; subsequent to receipt of the first frame from the first sensor 104*a*). The frame evaluator 116 can determine the time difference and can generate an identifier of the sensor 104 associated with synchronicity, such as to indicate that frame generation is to be performed for second frame from the second sensor 104; the second frame can be a target frame.

Responsive to detecting the condition associated with asynchronous condition, the frame evaluator 116 can cause an operation to mitigate the asynchronous condition and/or achieve synchronicity (e.g., frames having the same timestamps and/or target timestamps), such as to cause generation of a synchronized frame and/or a frame at a target timestamp of a missing frame. This can allow the system 100 (e.g., output generator 140) to generate output data, such as fused data, that is based on information from multiple sensors 104 and that can have fewer errors with respect to the real-world environment around the sensors 104.

As depicted in FIG. 1, the system 100 can include at least one motion detector 120. The motion detector 120 can detect an indication of motion between at least two frames from a given sensor 104, such as from the sensor 104*b*. For example, the motion detector 120 can detect an indication of motion between consecutive frames from the sensor 104*b*. The indication of motion can include a movement and/or a displacement (e.g., distance, such as distance in pixels), such as a displacement from a location of one or more first pixels in a first frame from the sensor 104*b* that represents a feature (e.g., object, feature of the environment) in the first frame and a location of one or more second pixels in a second frame from the sensor 104*b* that represents the feature. For example, the motion detector 120 can track the locations of the features in the frames to detect in the indication of motion. The motion detector 120 can detect the indication of motion based on displacement of pixels representing multiple features from the first frame to the second frame. In some implementations, the motion detector 120 detects the motion without individual processing of pixels or without reference to individual pixels, e.g., based at least on displacement of object locations and/or blocks in the frames that may or may not directly map to pixels. The motion detector 120 can generate the indication of motion (e.g., flow vector) to represent a composite of displacements of multiple features from the first frame to the second frame. The motion detector 120 can apply any one or more optical flow techniques, object or block matching or tracking techniques, machine learning model-based techniques, motion estimation and motion compensation (MEMC) techniques, or various combinations thereof to detect the motion.

The motion detector 120 can output the indication of motion as a vector, e.g., to represent the motion with X- and Y-coordinates of displacement. The motion detector 120 can output the indication of motion as a flow map that includes one or more vectors representing the detected motion(s).

In some implementations, the motion detector 120 includes at least one pre-processor 124. The pre-processor 124 can perform any of various operations on the first and second frames for which the motion is to be detected to facilitate generation of the indication of motion, such as to facilitate generation of optical flow information and/or the flow map. For example, the pre-processor 124 can generate a pyramid of image data representing features of the frames at multiple levels, e.g., levels of resolution. The pre-processor 124 and/or one or more components or operations thereof can be implemented by at least one of the PVA, a CPU, a video image compositor (VIC), or CUDA (e.g., as described with reference to FIG. 5). The pre-processor 124 can perform operations such as un-distortion and normalization, for example and without limitation.

The motion detector 120 can include at least one optical flow detector 128. The optical flow detector 128 can process data from the first and second frames, e.g., process the pyramid of image data, to determine the indication of motion. For example, the optical flow detector 128 can apply any one or more optical flow algorithms to detect motion of feature(s) represented by the first and second frames, such as to generate the flow map. For example, the optical flow detector 128 can generate the vector that represents motion from the first frame to the second frame, such as to represent a pixel displacement from the first frame to the second frame. The flow map can assign a displacement (e.g., in X- and Y-coordinates) to one or more pixels of a flow map frame, which can have the same dimensions as the frames from the second sensor 104*b*. As described further herein, the system 100 can determine the modified frame (e.g., intermediate frame between the first and second frames) based at least on the flow map and the time offset, such as to process the flow map according to a time ratio indicated by the time offset.

The motion detector can include at least one post-processor 132. The post-processor 132 can be used to perform post-processing of the output of the optical flow detector 128. For example, the post-processor 132 can perform smoothing or noise reduction of the output of the optical flow detector 128. In some implementations, the post-processor 132 includes a median filter, which can be used to modify one or more values of the output of the optical flow detector 128 based on medians of associated values from proximate frames. In some implementations, the optical flow detector 128 performs filtering operations. The post-processor 132 can perform operations such as blending or checking outputs from the optical flow detector 128.

In some implementations, one or more components of the motion detector 120 can be implemented by hardware components, such as accelerators, that can be coupled with CPU and/or GPU resources of the system 100. For example, the pre-processor 124 can be implemented as a programmable vision accelerator (PVA), and the optical flow detector 128 can be implemented as an optical flow accelerator (OFA). The use of such targeted hardware can allow for more efficient hardware resource usage and/or lower power requirements. For example, the optical flow operations that the motion detector 120 performs can be implemented on the OFA (e.g., with high and/or complete occupation of the OFA), which can allow for saving of CPU and GPU resources; the utilization rate of the PVA and OFA on the vehicle side may not be high, and thus these components may be available for greater utilization for performing operations of the system 100. As such, the system 100 can be implemented with greater overall hardware utilization in comparison with systems that may rely on CPU resources for software-side synchronization.

Referring further to FIG. 1, the system 100 can include at least one frame generator 136. The frame generator 136 can generate a modified frame (e.g., third frame), such as to modify the target frame from the second sensor 104*b* that is associated with detection of asynchronous condition by the frame evaluator 116, such as the frame that is not synchronized with the first frame from the first sensor 104*a* and/or the frame that is missing.

The frame generator 136 can generate the modified frame based at least on the time difference (e.g., determined by the frame evaluator 116, and/or the timestamp for which the modified frame is to be generated) and the indication of motion (e.g., determined by the motion detector 120). For example, the frame generator 136 can generate the modified frame as a new frame for the second sensor 104*b* that is synchronized with the first frame from the first sensor 104*a*, by using the indication of motion and the time difference to interpolate the target frame to a target time. The target time can be the time of the first timestamp of the first frame from the first sensor 104*a* and/or the time at which the missing frame was to have been received.

For example, the frame generator 136 can generate the modified frame by modifying locations of features of the target frame based at least on the indication of motion and the time difference, such as to interpolate modified locations for the features based at least on the indication of motion and the time difference. For example, where the indication of motion includes a flow map, the frame generator 136 can determine an amount to move features from locations (e.g., pixels) in the target frame to locations in the modified frame based on the flow map and the time difference. By generating the modified frame based on the indication of motion, the system 100 can allow for high video quality, as the synchronization rate of frames from sensors 104 can be made greater. In addition, the system 100 can perform the interpolation as a software synchronization to address situations where hardware synchronization might not otherwise achieve fully precise synchronization.

In some implementations, the system 100 uses the modified frames generated by the frame generator 136 to allow for reduced rates of output by one or more sensors 104. For example, the system 100 can determine that one or more sensors 104 are operating in a reduced frame rate mode, the system 100 can select one or more timestamps relative to timestamps of the output of the one or more sensors 104 to achieve a target frame rate, and interpolate frames to the selected timestamps to increase the frame rate to the target frame rate (in various such implementations, the system 100 may not perform time offset detection with respect to frames from multiple sensors, such as where the system 100 processes frames from a given sensor to determine the indication of motion from the processed frames and to generate the interpolated frame(s) according to the indication of motion and the selected time stamps, e.g., without relying on information from other sensors 104).

In some implementations, the system 100 generates the modified frames to account for output delays, such as processing delays and/or transmission delays. For example, responsive to detecting at least a threshold delay (e.g., latency) associated with receipt or output of data at one or more points, such as along a data processing pipeline associated with the system 100, the system 100 can cause generate of the modified frame for a target time at which the data is expected. This can include, for example, generating output image frames for display.

Referring further to FIG. 1, the system 100 can include or be coupled with at least one output generator 140. The output generator 140 can generate outputs based at least on the synchronized frames from the sensors 104. For example, the output generator 140 can generate one or more outputs based at least on the first frame from the first sensor 104*a* and the modified frame (e.g., modification of the target frame from the second sensor 104*b*) generated by the frame generator 136. The output generator 140 can generate outputs for operations including but not limited to displaying data, computer vision tasks, perception tasks, or vehicle control tasks. In some implementations, the output generator 140 generates an output that combines the first frame and the modified frame. For example, the output generator 140 can generate a surround view, such as to generate a 2D stitch of the first frame and the modified frame. The output generator 140 can generate a 3D reconstruction of the environment represented by the data from the sensors 104.

Figure 2:
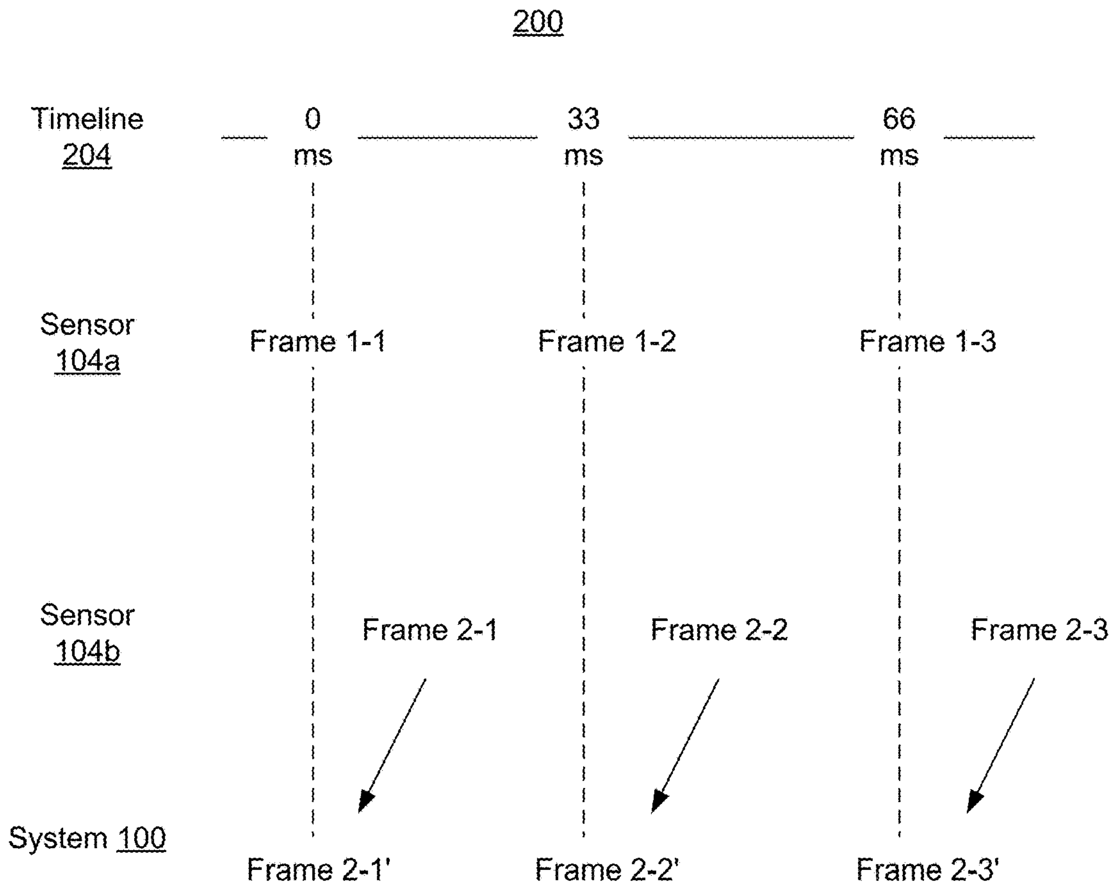
FIG. 2 is a schematic diagram of an example of a frame interpolation to perform synchronization, in accordance with some implementations of the present disclosure.

FIG. 2 depicts an example of a process 200 for synchronization of offset frames, in accordance with some implementations of the present disclosure. The system 100 can perform one or more operations of the process 200.

As depicted in FIG. 2, the first sensor 104*a* can output frames 1-1, 1-2, 1-3, and the second sensor 104*b* can output frames 2-1, 2-2, 2-3, along a timeline 204. For example, the sensors 104*a*, 104*b*, can output the frames at a frame rate of 30 fps as depicted in FIG. 2, corresponding to timestamps of 0 ms for the frame 1-1, 33 ms for the frame 1-2, and 66 ms for the frame 1-3. The frames 2-1, 2-2, 2-3 are offset from the frames 1-1, 1-2, 1-3 (e.g., by about 10-15 ms as depicted in FIG. 2). In various implementations, the process 200 (and processes 300, 350 described with reference to FIGS. 3A and 3B) can be performed in accordance with frame rates (and timestamps) greater or less than as described with reference to FIG. 2, including with differing frame rates amongst two or more sensors 104.

The system 100 can receive the frames from the sensors 104*a*, 104*b*, and detect the offset(s) between the frames 1-1, 2-1, the frames 1-2, 2-2, and/or the frames 1-3, 2-3. For example, the system 100 can determine the time difference(s) between the frames 1-1, 2-1, the frames 1-2, 2-2, and/or the frames 1-3, 2-3, which can indicate asynchronous condition. Responsive to detecting the offset (e.g., that the frames from the second sensor 104*b* are offset and/or asynchronous), the system 100 can process consecutive frames from the second sensor 104*b* to detect an indication of motion with respect to the consecutive frames, such as between the frames 2-1, 2-2, the frames 2-2, 2-3, the frame 2-1 and a prior frame, and/or the frame 2-3 and a frame subsequent to the frame 2-3. For example, the system 100 can provide any of various such pairs of consecutive frames as input to the optical flow detector 128 to cause the optical flow detector 128 to generate the indication of motion, such as to generate a flow map representing displacement between the consecutive frames.

The system 100 can generate one or more of modified frames 2-1' (e.g., such that the frame 2-1 is a first frame, the frame 2-2 is a second frame, the modified frame 2-1' is a third frame, and the frame 1-1 used to detect the offset is fourth frame), 2-2', 2-3' based at least on the offset and the indication of motion, such as to interpolate the frame 2-1 to the frame 2-1' at timestamp 0 ms, the frame 2-2 to frame 2-2' at timestamp 33 ms, and/or the frame 2-3 to frame 2-3' at the timestamp 66 ms. As such, the system 100 can align the frames from the second sensor 104*b* with the frames from the first sensor 104*a* to allow for precise synchronization.

Figure 3A:
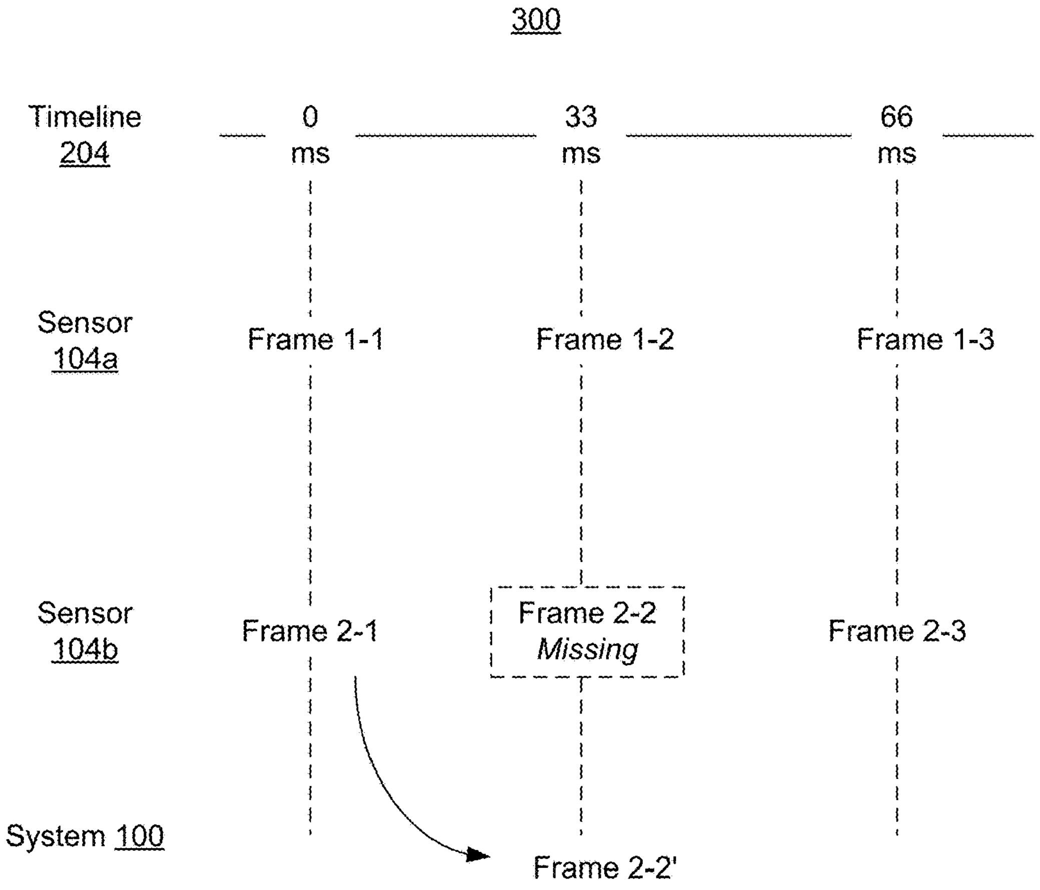
FIG. 3A is a schematic diagram of an example of an interpolated frame insertion to replace a missing frame, in accordance with some implementations of the present disclosure.

FIG. 3A depicts an example of a process 300 for synchronization of missing frames, in accordance with some implementations of the present disclosure. The system 100 can perform one or more operations of the process 300. For example, in scenarios with a large number of sensors 104 (e.g., more than three sensors, more than five sensors, more than ten sensors), the likelihood of at least one sensor 104, at a given timestamp, dropping a frame may not be negligible. By implementing the process 300, the system 100 can prevent situations in which frames from all the sensors 104, in addition to the missing frame, may need to be dropped.

For example, as depicted in FIG. 3A, the first sensor 104*a* outputs frames 1-1, 1-2, 1-3 at the timestamps 0 ms, 33 ms, and 66 ms, and the second sensor 104*b* outputs frames 2-1, 2-3 at the timestamps 0 ms, 66 ms, synchronized with respective frames 1-1, 1-3. However, the frame expected at the timestamp 33 ms from the second sensor 104*b* is missing.

Responsive to detecting the missing frame, the system 100 can detect an indication of motion, e.g., perform optical flow, with respect to the frame 2-1 (or the frame 2-3, such as to generate the modified frame 2-2' for the missing frame 2-2 using the frame 2-3 as the original frame, e.g., in the other direction relative to the example depicted in FIG. 3A), such as by processing the frame 2-1 and a frame prior to the frame 2-1. The system 100 can generate a modified frame 2-2' for the missing frame 2-2 at the timestamp of 33 ms based at least on the indication of motion and the timestamp of 33 ms (and/or an offset of 33 ms from the timestamp 0 ms of the frame 2-1 to the timestamp 33 ms, for example). For example, in a first mode (e.g., predictive mode), the system 100 can generate (e.g., using frame generator 136) the modified frame 2-2' based on the flow map (e.g., determined by the optical flow generator 128) for the frame 2-1 and a prior frame, e.g., using the frame 2-1 as the original frame to be modified to determine the modified frame 2-2'. In a second mode (e.g., a non-predictive mode), the system 100 can generate the modified frame 2-2' based on the flow map for the frame 2-3 and the frame 2-1, e.g., using the frame 2-1 as the original frame to be modified to determine the modified frame 2-2'.

Figure 3B:
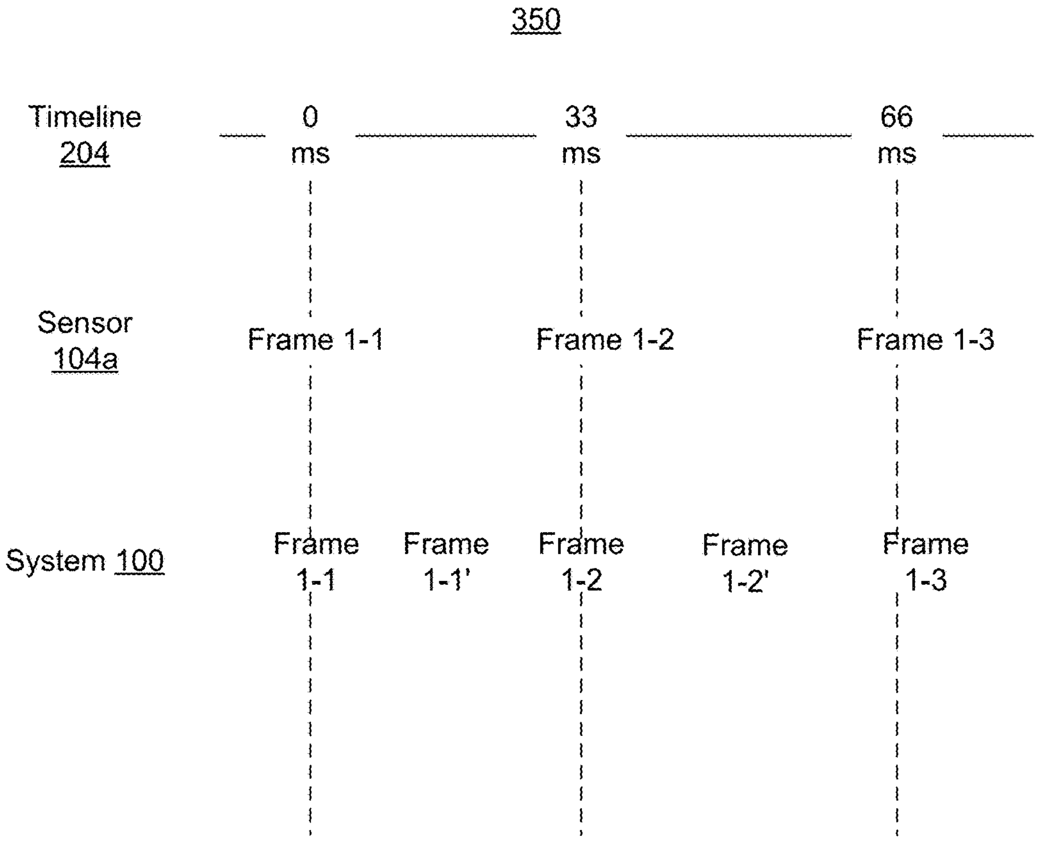
FIG. 3B is a schematic diagram of an example of an interpolated frame insertion to increase a frame rate, in accordance with some implementations of the present disclosure.

FIG. 3B depicts an example of a process 350 for increasing frame rate of frames outputted by the sensor 104*a*, in accordance with some implementations of the present disclosure. As depicted in FIG. 3B, the system 100 can generate a frame 1-1' (e.g., at a selected timestamp between those of the frames 1-1, 1-2) based at least on the frames 1-1, 1-2, and can generate a frame 1-2' (e.g., at a selected timestamp between those of the frames 1-2, 1-3) based at least on the frames 1-2, 1-3. For example, the system 100 can provide the frames 1-1, 1-2 as input to the optical flow detector 128 to generate an indication of motion between the frames 1-1, 1-2, and can determine the frame 1-1' based on the selected timestamp and the indication of motion (and can determine the frame 1-2' based on the selected timestamp and the indication of motion).

Figure 4:
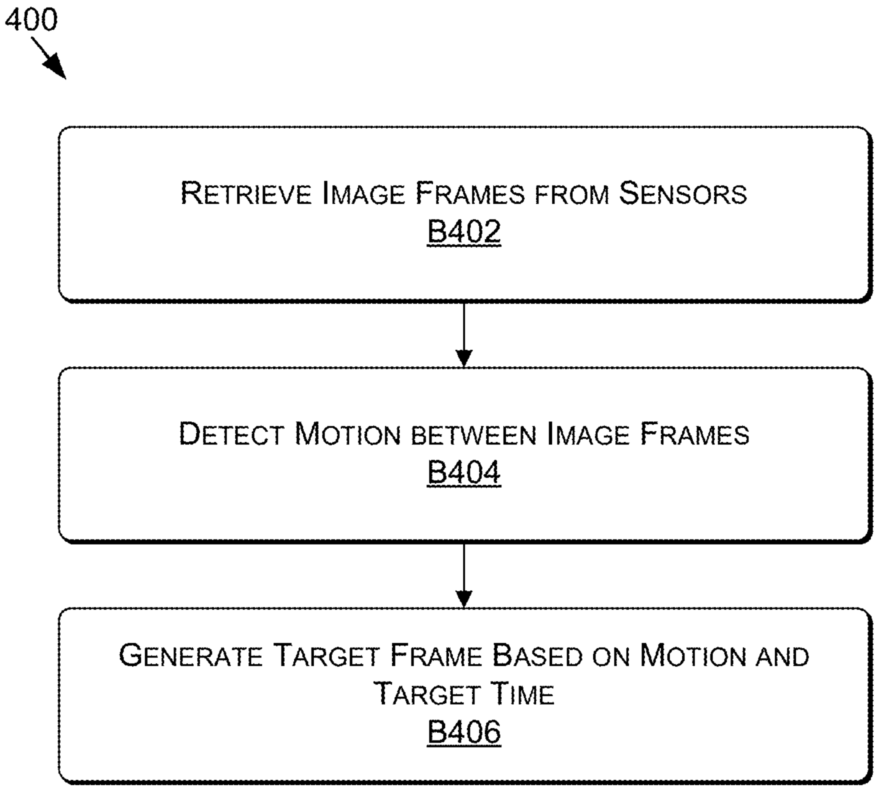
FIG. 4 is a flow diagram of a method of frame interpolation, in accordance with some implementations of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to the system 100 of FIG. 1. However, these methods may additionally or alternatively be executed by any one system, or any combination of systems, including, but not limited to, those described herein. The method 400 can be at least partially performed using hardware accelerators, e.g., in conjunction with a CPU and/or GPU. The method 400 can include one or more operations described with reference to FIG. 2 and/or FIG. 3.

FIG. 4 is a flow diagram showing a method 400 for synchronization of sensor data, in accordance with some implementations of the present disclosure. The method 400 can be performed responsive to receipt of and/or sampling of sensor data from one or more sensors. The method 400 can be performed responsive to a request to adjust (e.g., increase) a frame rate of data.

The method 400, at block B402, includes retrieving image frames from one or more sensors. For example, image frames from a plurality of one or cameras, LIDAR sensors, and/or RADAR sensors can be received at one or more timestamps. In some implementations, a first frame from a first sensor may be asynchronous with a second image frame from a second sensor, such as to be offset in time from the first image frame. In some implementations, one or more frames from one or more sensors can be missing, such as to not have been outputted and/or received within a threshold range of time relative to an expected time, such as an expected time associated with a frame rate for the one or more frames. The image frames can be retrieved periodically, e.g., according to a read out from the sensors and/or the frame rate of the sensors. The image frames can be retrieved responsive to a request for the image frames.

The method 400, at block B404, includes detecting motion between image frames from a given sensor. For example, responsive to detecting asynchronous condition with respect to image frames from the given sensor a plurality of image frames (e.g., two consecutive image frames) from the given sensor can be processed to detect the motion, such as to detect a displacement across the image frames. This can include, for example, detecting displacement of pixels representing one or more features in the image frames. For example, the motion can represent an amount of displacement of features over time between timestamps of the image frames. In some implementations, the image frames can be applied to an optical flow algorithm and/or hardware that executes optical flow, such as an optical flow accelerator, to detect the motion.

The method 400, at block B406, includes generating a target frame based on the detected motion and a target time for the target frame. The target time can be a timestamp of a frame from another sensor, such as to synchronize a frame from the given sensor with a frame from the other sensor. The target time can be a timestamp at which a missing frame was expected to have been received.

For example, one or more of the image frames from the given sensor can be interpolated to the target time, such as from a respective timestamp of the one or more image frames to the target time, using the detected motion. For example, where the detection motion includes a flow map assigning a displacement vector to one or more pixels in an image-like data structure, the one or more frames can be modified by interpolating the locations of features associated with pixels in the one or more frames to modified locations in the target frame based on the displacements of the displacement vectors. In some implementations, the target frame is used for additional processing and/or output generation, such as stitching, reconstruction, and/or display operations.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed implementations may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems including one or more large language models (LLMs), systems including one or more vision language models (VLMs), systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

Example Autonomous Vehicle

Figure 5A:
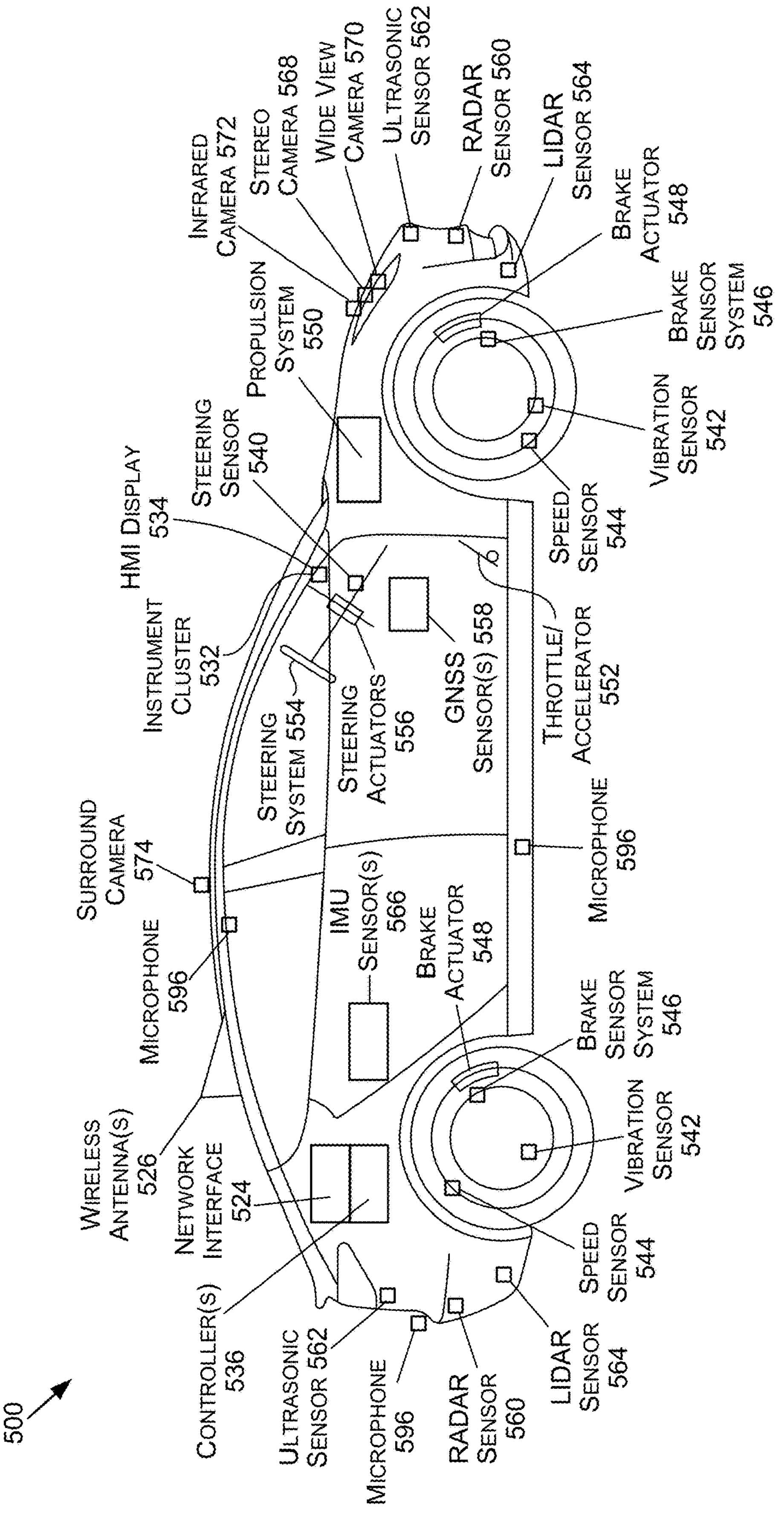
FIG. 5A is an illustration of an example autonomous vehicle, in accordance with some implementations of the present disclosure.

FIG. 5A is an illustration of an example autonomous vehicle 500, in accordance with some implementations of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the implementation. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems ("GNSS") sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types. The system 100 can be used to process sensor data from any one or more such sensors, such as to synchronize and/or increase precision of the sensor data with respect to target timing.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the High Definition ("HD") map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 526 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 5B:
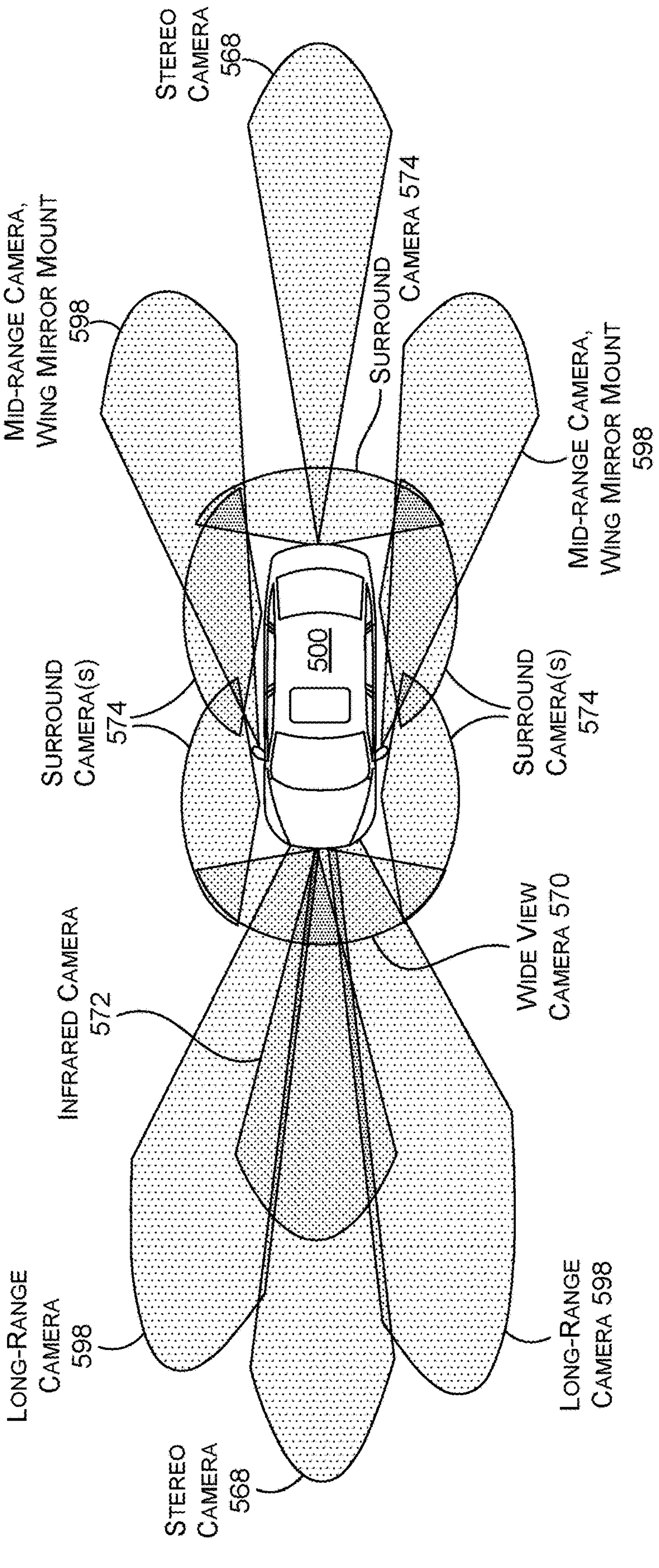
FIG. 5B is an example of camera locations and fields of view for the example autonomous vehicle of FIG. 5A, in accordance with some implementations of the present disclosure.

FIG. 5B is an example of camera locations and fields of view for the example autonomous vehicle 500 of FIG. 5A, in accordance with some implementations of the present disclosure. The cameras and respective fields of view are one example implementation and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the implementation. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some implementations, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may be any number (including zero) of wide-view cameras 570 on the vehicle 500. In addition, any number of long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking. In some implementations, the vehicle 500 includes ten or more (e.g., eleven, fourteen) cameras.

Any number of stereo cameras 568 may also be included in a front-facing configuration. In at least one implementation, one or more of stereo camera(s) 568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
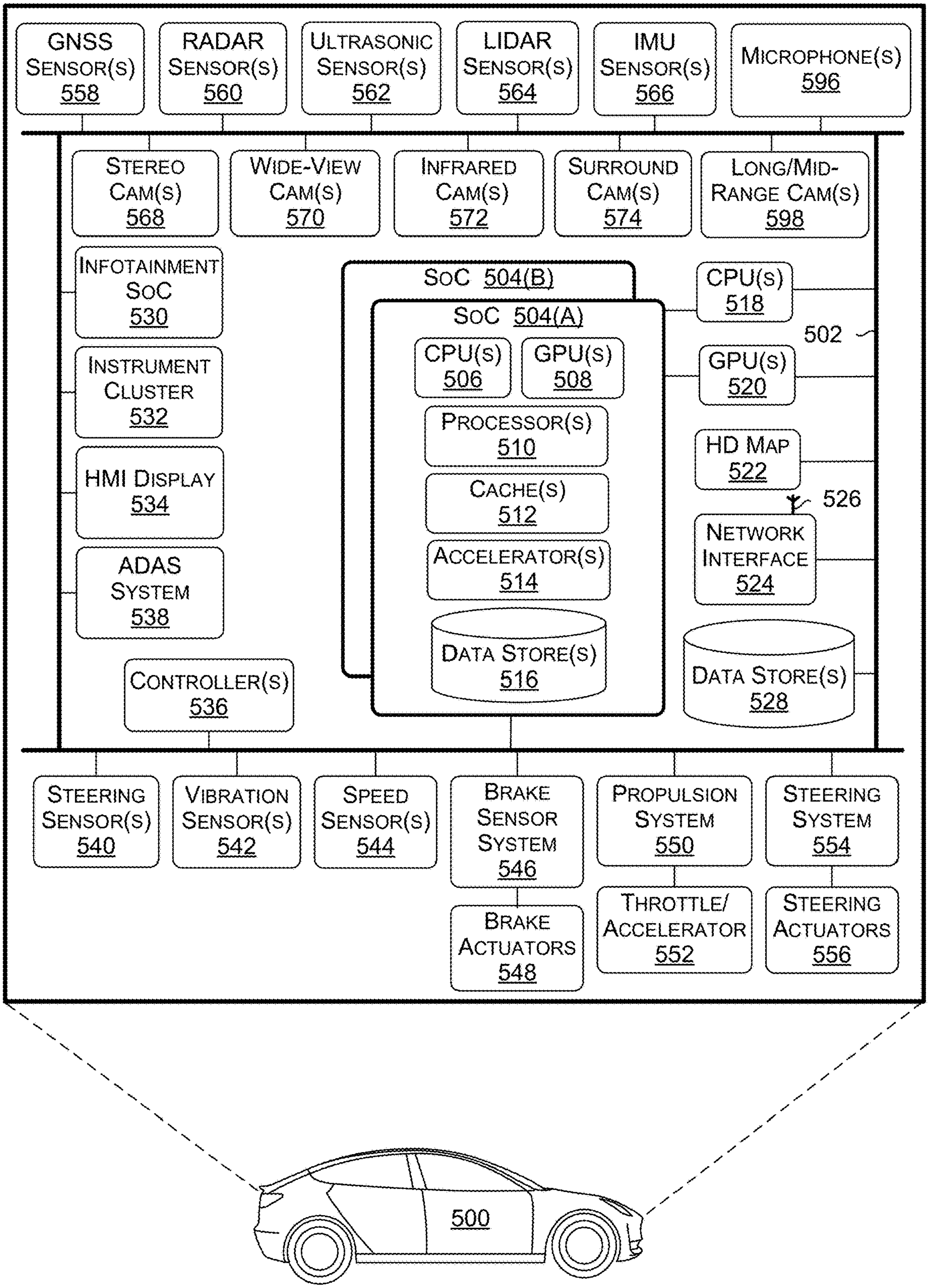
FIG. 5C is a block diagram of an example system architecture for the example autonomous vehicle of FIG. 5A, in accordance with some implementations of the present disclosure.

FIG. 5C is a block diagram of an example system architecture for the example autonomous vehicle 500 of FIG. 5A, in accordance with some implementations of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions.

The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some implementations, the CPU(s) 506 may include eight cores in a coherent multi-processor configuration. In some implementations, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some implementations, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the implementation, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system.

For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the implementation. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some implementations, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some implementations, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one implementation of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras. The PVA may be used for pre-processing for optical flow operations (e.g., to generate pyramids to be processed by an optical flow accelerator (OFA)).

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred implementation, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some implementations, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the implementations and requirements for the vehicle 500, and any combination of camera types may be used to provide the necessary coverage around the vehicle 500. In addition, the number of cameras may differ depending on the implementation. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some implementations, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In implementations that include a neural network(s) running on the supervisory MCU, the supervisory MCU may include at least one of a DLA or GPU suitable for running the neural network(s) with associated memory. In preferred implementations, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
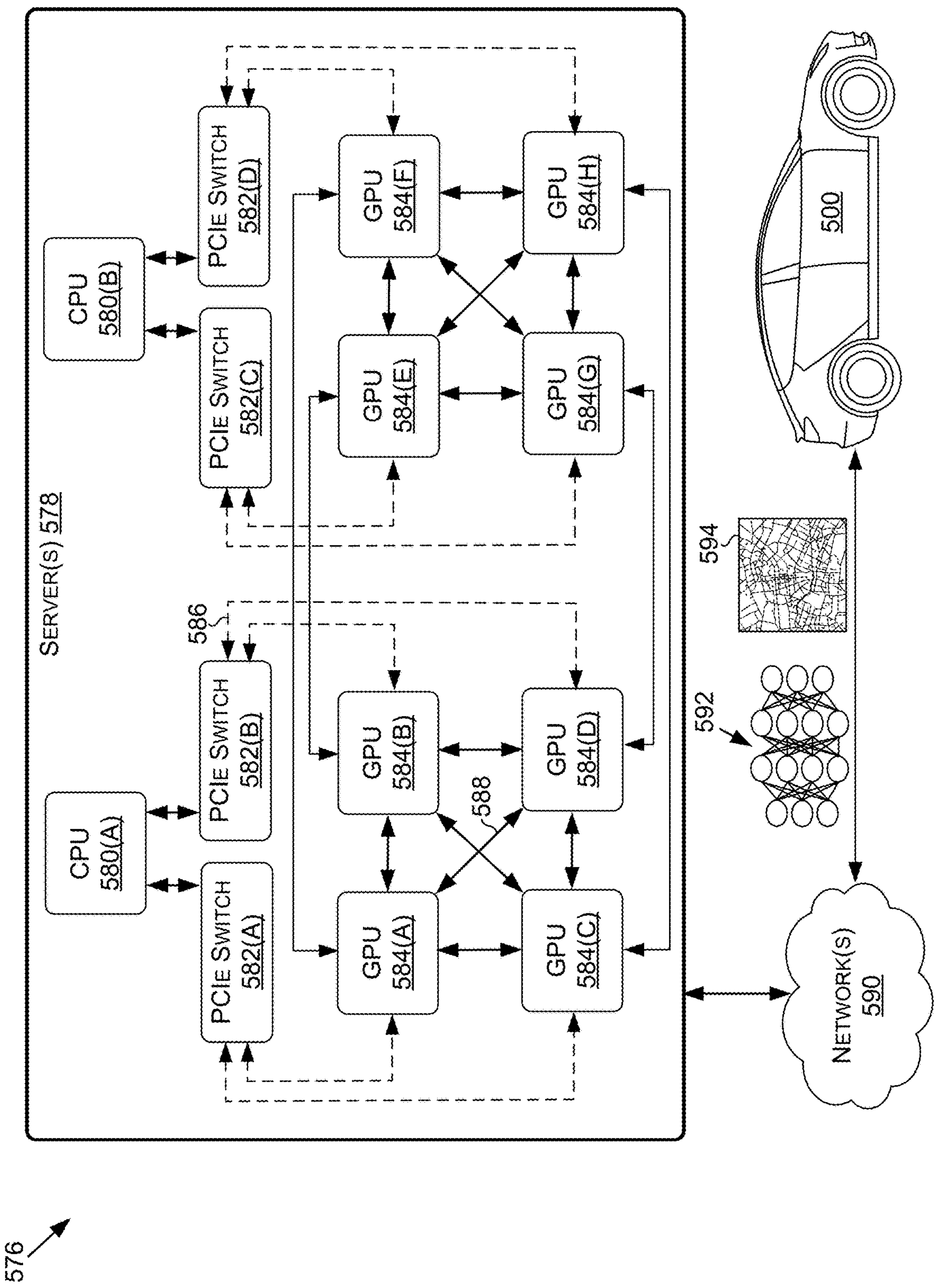
FIG. 5D is a system diagram for communication between cloud-based server(s) and the example autonomous vehicle of FIG. 5A, in accordance with some implementations of the present disclosure.

FIG. 5D is a system diagram for communication between cloud-based server(s) and the example autonomous vehicle 500 of FIG. 5A, in accordance with some implementations of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the implementation, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
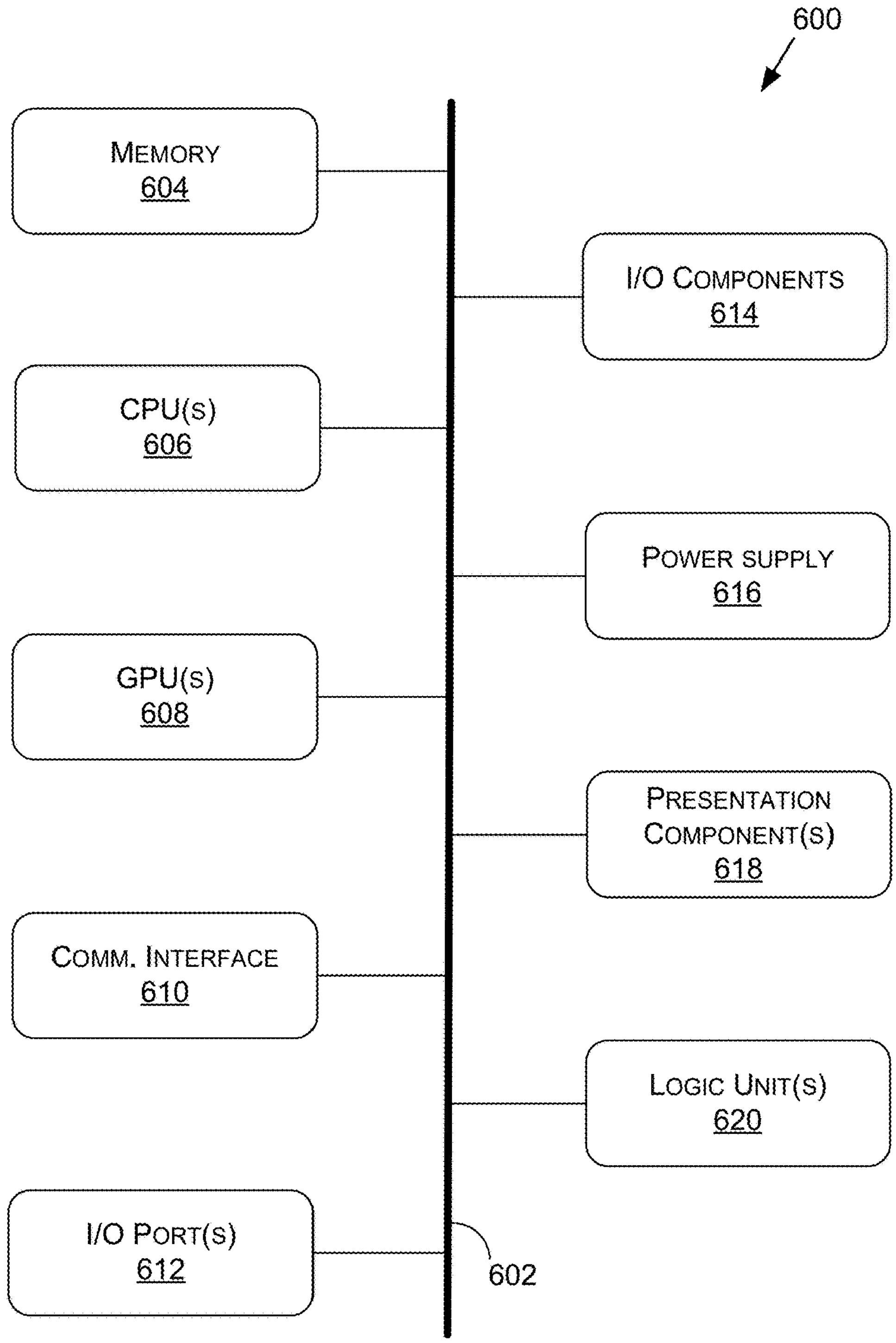
FIG. 6 is a block diagram of an example computing device suitable for use in implementing some implementations of the present disclosure.

FIG. 6 is a block diagram of an example computing device(s) 600 suitable for use in implementing some implementations of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one implementation, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof. The computing device 600 can be used to implement at least some components of the system 100.

Although the various blocks of FIG. 6 are shown as connected via the interconnect system 602 with lines, this is not intended to be limiting and is for clarity only. For example, in some implementations, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some implementations, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In implementations, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In implementations, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In implementations, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more implementations, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
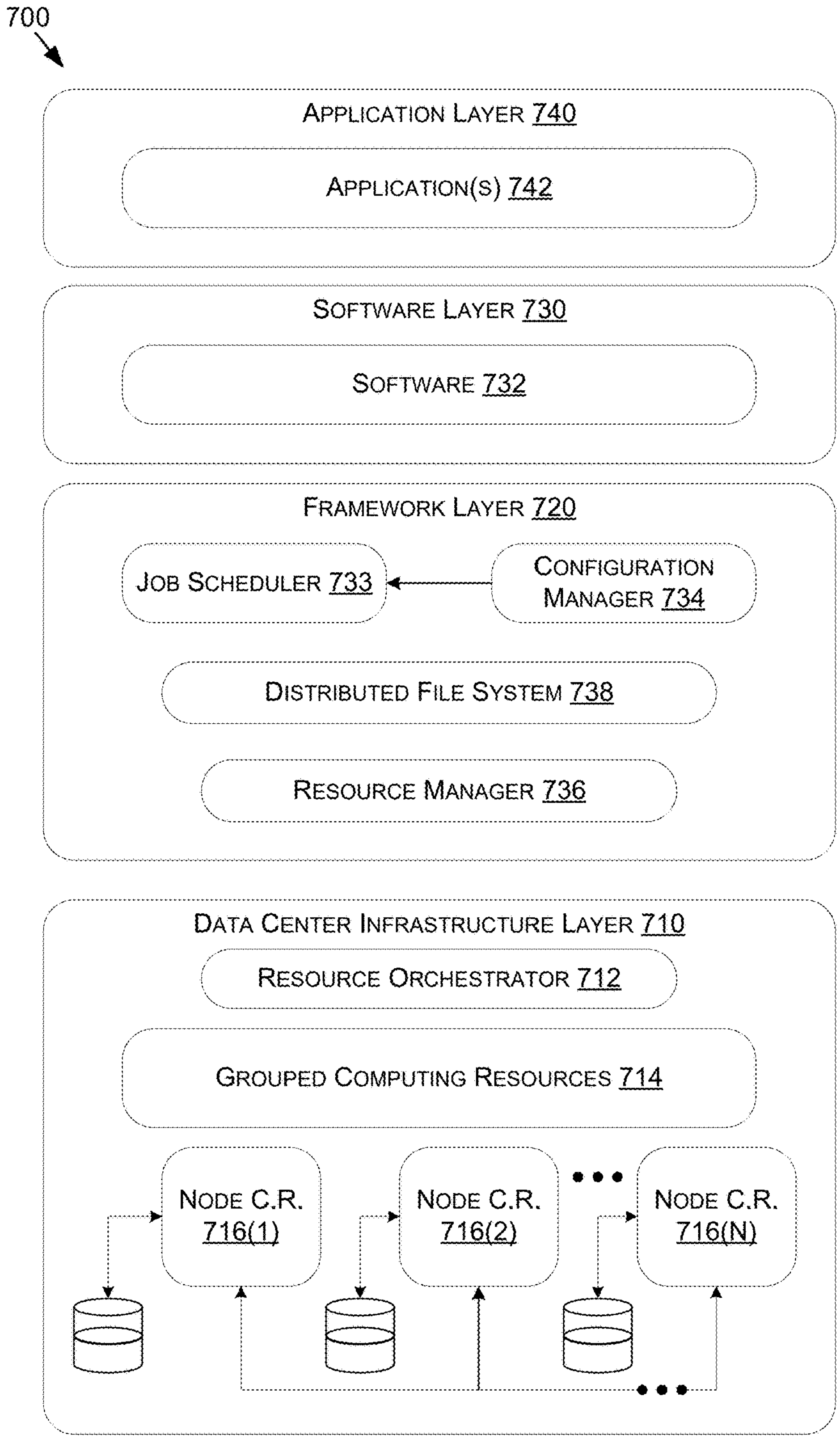
FIG. 7 is a block diagram of an example data center suitable for use in implementing some implementations of the present disclosure.

FIG. 7 illustrates an example data center 700 that may be used in at least one implementations of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one implementation, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some implementations, one or more node C.R.s from among node C.R.s 716(1)-716(N) may correspond to a server having one or more of the above-mentioned computing resources. In addition, in some implementations, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one implementation, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one implementation, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one implementation, resource orchestrator 712 may include a software design infrastructure (SDI) management entity for the data center 700. The resource orchestrator 712 may include hardware, software, or some combination thereof.

In at least one implementation, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one implementation, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one implementation, clustered or grouped computing resources may include grouped computing resource 714 at data center infrastructure layer 710. The resource manager 736 may coordinate with resource orchestrator 712 to manage these mapped or allocated computing resources.

In at least one implementation, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software. The software 732 can be used to implement one or more operations of the system 100.

In at least one implementation, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more implementations.

In at least one implementation, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more implementations described herein. For example, a machine learning model(s) may be trained by calculating weight parameters according to a neural network architecture using software and/or computing resources described above with respect to the data center 700. In at least one implementation, trained or deployed machine learning models corresponding to one or more neural networks may be used to infer or predict information using resources described above with respect to the data center 700 by using weight parameters calculated through one or more training techniques, such as but not limited to those described herein.

In at least one implementation, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing implementations of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one implementation, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In implementations, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising:
one or more circuits to:
detect an asynchronous condition of sensor data from a sensor;
determine, responsive to detecting the asynchronous condition, motion associated with a first frame of the sensor data and a second frame of the sensor data;
generate a third frame based at least on the motion and the first frame; and
perform one or more operations associated with a machine based at least on the generated third frame.

2. The one or more processors of claim 1, wherein the one or more circuits are to detect the motion by detecting an optical flow between the first frame and the second frame.

3. The one or more processors of claim 1, wherein the sensor is a first sensor, and the one or more circuits are to detect the asynchronous condition responsive to detecting a difference in time between a timestamp of the first frame and a timestamp of a fourth frame from at least one second sensor.

4. The one or more processors of claim 1, wherein the one or more circuits are to detect the asynchronous condition responsive to detecting a missing frame not being received from the sensor at an expected timestamp for the missing frame.

5. The one or more processors of claim 1, wherein the sensor is a first sensor, and the one or more circuits are to generate the third frame to have a timestamp equal to a timestamp of a fourth frame from a second sensor.

6. The one or more processors of claim 1, wherein the one or more circuits are to generate the third frame to have a timestamp subsequent to a timestamp of the first frame and the second frame.

7. The one or more processors of claim 1, wherein the one or more circuits are to detect the motion based at least on a displacement of at least one pixel representing an object or feature from a first location in the first frame to a second location in the second frame.

8. The one or more processors of claim 1, wherein the sensor comprises a camera, a light detection and ranging (LIDAR) system, or a radio frequency detection and ranging (RADAR) system.

9. The one or more processors of claim 1, wherein the one or more processors are comprised in at least one of:
a control system for an autonomous or semi-autonomous machine;
a perception system for an autonomous or semi-autonomous machine;
a system incorporating one or more virtual machines (VMs);
a system implemented using a robot;
a system for performing deep learning operations;
a system for performing simulation operations;
a system for performing collaborative content creation for 3D assets;
a system for generating synthetic data;
a system for performing digital twin operations;
a system implemented using an edge device;
a system comprising one or more vision language models (VLMs);
a system comprising one or more large language models (LLMs);
a system comprising one or more multi-modal language models;
a system for performing conversational AI operations;
a system for performing light transport simulation;
a system implemented at least partially in a data center; or
a system implemented at least partially using cloud computing resources.

10. A system comprising:
one or more processors to cause performance of operations comprising:
detecting an asynchronous condition of sensor data from a sensor;
determining, responsive to detecting the asynchronous condition, motion associated with a first frame of the sensor data and a second frame of the sensor data; and
generating a third frame based at least on the motion and the first frame.

11. The system of claim 10, wherein the one or more processing units are to detect the motion by detecting an optical flow between the first frame and the second frame.

12. The system of claim 10, wherein the sensor is a first sensor, and the one or more processing units are to detect the asynchronous condition responsive to detecting a difference in time between a timestamp of the first frame and a timestamp of a fourth frame from at least one second sensor.

13. The system of claim 10, wherein the detecting the asynchronous condition is responsive to detecting a missing frame not being received from the sensor at an expected timestamp for the missing frame.

14. The system of claim 10, wherein the sensor is a first sensor, and the operations further comprising generating the third frame to have a timestamp equal to a timestamp of a fourth frame from a second sensor.

15. The system of claim 10, wherein the operations further comprise generating the third frame to have a timestamp subsequent to a timestamp of the first frame and the second frame.

16. The system of claim 10, wherein the detecting the motion is based at least on a displacement of at least one pixel representing an object or feature from a first location in the first frame to a second location in the second frame.

17. The system of claim 10, wherein the sensor comprises a camera, a light detection and ranging (LIDAR) system, or a radio frequency detection and ranging (RADAR) system.

18. The system of claim 10, wherein the system is comprised in at least one of:
a control system for an autonomous or semi-autonomous machine;
a perception system for an autonomous or semi-autonomous machine;
a system incorporating one or more virtual machines (VMs);
a system implemented using a robot;
a system for performing deep learning operations;
a system for performing simulation operations;
a system for performing collaborative content creation for 3D assets;
a system for generating synthetic data;
a system for performing digital twin operations;
a system implemented using an edge device;
a system comprising one or more vision language models (VLMs);
a system comprising one or more large language models (LLMs);
a system comprising one or more multi-modal language models;

a system for performing conversational AI operations;
a system for performing light transport simulation;
a system implemented at least partially in a data center; or
a system implemented at least partially using cloud computing resources.

19. A method comprising:
detecting, using one or more processors, an asynchronous condition of sensor data from a sensor;
determining, using the one or more processors, responsive to detecting the asynchronous condition, motion associated with a first frame of the sensor data and a second frame of the sensor data; and
generating, using the one or more processors, a third frame based at least on the motion and the first frame.

20. The method of claim 19, wherein the sensor is a first sensor, the detecting the asynchronous condition comprises detecting at least a threshold time difference between the first frame and a fourth frame from a second sensor, and the generating the third frame comprises interpolating the first frame to a timestamp of the fourth frame.

* * * * *